US010984671B2

(12) United States Patent
Kojo

(10) Patent No.: US 10,984,671 B2
(45) Date of Patent: Apr. 20, 2021

(54) INFORMATION DISPLAY APPARATUS, INFORMATION DISPLAY METHOD, AND COMPUTER-READABLE RECORDING MEDIUM

(71) Applicant: CASIO COMPUTER CO., LTD., Tokyo (JP)

(72) Inventor: Takashi Kojo, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 292 days.

(21) Appl. No.: 15/925,696

(22) Filed: Mar. 19, 2018

(65) Prior Publication Data
US 2018/0277008 A1 Sep. 27, 2018

(30) Foreign Application Priority Data
Mar. 22, 2017 (JP) .............................. JP2017-055584

(51) Int. Cl.
*G09B 7/04* (2006.01)
*G06F 16/903* (2019.01)
(Continued)

(52) U.S. Cl.
CPC ............. *G09B 7/04* (2013.01); *G06F 3/0481* (2013.01); *G06F 3/0484* (2013.01);
(Continued)

(58) Field of Classification Search
CPC ... G09B 7/00; G09B 7/02; G09B 7/06; G09B 7/04; G09B 5/08; G09B 5/125;
(Continued)

(56) References Cited

U.S. PATENT DOCUMENTS 4,456,973 A 6/1984 Carlgren et al.
6,154,757 A * 11/2000 Krause .................. G06F 40/166
715/205
(Continued)

FOREIGN PATENT DOCUMENTS

JP 06236138 A 8/1994
JP 07078148 A 3/1995
(Continued)

OTHER PUBLICATIONS

Extended European Search Report dated Jul. 13, 2018 issued in European Application No. 18162212.7.
(Continued)

*Primary Examiner* — Jack Yip
(74) *Attorney, Agent, or Firm* — Holtz, Holtz & Volek PC

(57) ABSTRACT

According one embodiment, there is provided an information display apparatus including a processor, the processing being configured to display a character string including a plurality of keywords on a display; to detect a kind of an association operation when the processor accepts designation by a user operation of any one of the keywords displayed on the display, and accepts the association operation of related information corresponding to the designated keyword; and to set a problem-setting method with respect to the designated keyword, the problem-setting method corresponding to the detected kind of the association operation.

17 Claims, 11 Drawing Sheets

(51) Int. Cl.
| | |
|---|---|
| *G09B 5/12* | (2006.01) |
| *G09B 5/08* | (2006.01) |
| *G09B 7/06* | (2006.01) |
| *G09B 5/14* | (2006.01) |
| *G06F 40/284* | (2020.01) |
| *G06F 3/0481* | (2013.01) |
| *G06F 3/0484* | (2013.01) |
| *B43L 1/10* | (2006.01) |

(52) U.S. Cl.
CPC ...... *G06F 16/90344* (2019.01); *G06F 40/284* (2020.01); *G09B 5/08* (2013.01); *G09B 5/125* (2013.01); *G09B 5/14* (2013.01); *G09B 7/06* (2013.01); *B43L 1/10* (2013.01)

(58) Field of Classification Search
CPC ... G09B 5/14; G06F 16/90344; G06F 40/284; G06F 3/0481; G06F 3/0484; B43L 1/10
See application file for complete search history.

(56) References Cited

U.S. PATENT DOCUMENTS

| | | | |
|---|---|---|---|
| 6,175,841 | B1 | 1/2001 | Loiacono |
| 7,717,712 | B2* | 5/2010 | Brun ............... G06F 40/253 434/156 |
| 8,250,071 | B1* | 8/2012 | Killalea ............. G06F 40/30 707/728 |
| 9,460,162 | B1 | 10/2016 | Ostler et al. |
| 9,466,225 | B2 | 10/2016 | Mori et al. |
| 9,812,028 | B1* | 11/2017 | Elchik ............... G10L 15/26 |
| 10,460,023 | B1 | 10/2019 | Shriver |
| 2004/0023191 | A1 | 2/2004 | Brown et al. |
| 2005/0079477 | A1* | 4/2005 | Diesel ............... H04L 67/42 434/350 |
| 2007/0072164 | A1 | 3/2007 | Katsuyama et al. |
| 2007/0136657 | A1* | 6/2007 | Blumenthal ........ G06Q 30/02 715/201 |
| 2007/0269775 | A1* | 11/2007 | Andreev ............. G09B 7/00 434/156 |
| 2007/0298384 | A1* | 12/2007 | Jenkins ............... G09B 5/06 434/156 |
| 2008/0318200 | A1* | 12/2008 | Hau ................... G09B 5/06 434/362 |
| 2010/0021871 | A1* | 1/2010 | Layng ............... G09B 7/02 434/178 |
| 2010/0273138 | A1* | 10/2010 | Edmonds ............ G09B 3/00 434/322 |
| 2011/0093292 | A1* | 4/2011 | Hussam ............. G16H 10/60 705/3 |
| 2011/0093481 | A1* | 4/2011 | Hussam ............. G06F 16/20 707/756 |
| 2012/0329013 | A1* | 12/2012 | Chibos ............... G09B 5/06 434/157 |
| 2013/0073932 | A1 | 3/2013 | Migos et al. |
| 2013/0073998 | A1 | 3/2013 | Migos et al. |
| 2013/0080471 | A1 | 3/2013 | Forte et al. |
| 2013/0275120 | A1* | 10/2013 | DeGross ............. G06F 40/40 704/9 |
| 2014/0024009 | A1* | 1/2014 | Nealon ............... G09B 5/12 434/362 |
| 2014/0335497 | A1 | 11/2014 | Gal et al. |
| 2015/0044653 | A1 | 2/2015 | Levine et al. |
| 2015/0088932 | A1* | 3/2015 | Sauz ................. G06Q 50/20 707/779 |
| 2015/0104762 | A1* | 4/2015 | Luke ................ G09B 19/04 434/169 |
| 2015/0106703 | A1* | 4/2015 | Fraundorf ............ G06F 40/247 715/271 |
| 2015/0254999 | A1* | 9/2015 | Goll .................. G09B 5/06 434/169 |
| 2015/0375093 | A1 | 12/2015 | Casey |
| 2016/0155348 | A1* | 6/2016 | Hall .................. G09B 7/08 434/327 |
| 2017/0293826 | A1 | 10/2017 | Kemmochi et al. |
| 2018/0011830 | A1 | 1/2018 | Iida et al. |
| 2018/0126260 | A1 | 5/2018 | Chansoriya et al. |
| 2018/0277006 | A1 | 9/2018 | Kojo |
| 2018/0277009 | A1 | 9/2018 | Kojo |

FOREIGN PATENT DOCUMENTS

| | | |
|---|---|---|
| JP | 2002062792 A | 2/2002 |
| JP | 2002268536 A | 9/2002 |
| JP | 2003036016 A | 2/2003 |
| JP | 2004258184 A | 9/2004 |
| JP | 2005070939 A | 3/2005 |
| JP | 2007094055 A | 4/2007 |
| JP | 2010175699 A | 8/2010 |
| JP | 2010284797 A | 12/2010 |
| JP | 2013072927 A | 4/2013 |
| JP | 2013161463 A | 8/2013 |
| JP | 2014038209 A | 2/2014 |
| JP | 2015125561 A | 7/2015 |
| JP | 2016156883 A | 9/2016 |
| JP | 2017049529 A | 3/2017 |
| WO | 2016117321 A1 | 7/2016 |

OTHER PUBLICATIONS

European Office Action dated Aug. 26, 2019 issued in counterpart European Application No. 18162212.7.
Office Action (Non-Final Rejection) dated Mar. 27, 2020 issued in U.S. Appl. No. 15/925,736.
Office Action (Non-Final Rejection) dated Mar. 31, 2020 issued in U.S. Appl. No. 15/925,715.
Related U.S. Appl. No. 15/925,715; First Named Inventor: Takashi Kojo; Title: "Information Display Apparatus, Information Display Method, and Computer-Readable Recording Medium"; filed Mar. 19, 2018.
Related U.S. Appl. No. 15/925,736; First Named Inventor: Takashi Kojo; Title: "Information Display Apparatus, Information Display Terminal, Method of Controlling Information Display Apparatus, Method of Controlling Info"; filed Mar. 19, 2018.
Office Action (Final Rejection) dated Oct. 13, 2020 issued in related U.S. Appl. No. 15/925,715.
Office Action (Final Rejection) dated Sep. 25, 2020 issued in related U.S. Appl. No. 15/925,736.
Japanese Office Action (and English language translation thereof) dated Oct. 13, 2020 issued in Japanese Application No. 2017-055584.
Notice of Allowance dated Dec. 11, 2020 issued in related U.S. Appl. No. 15/925,736.
Japanese Office Action (and English language translation thereof) dated Dec. 1, 2020 issued in related Japanese Application No. 2017-057238.
Yuji, et al., "Information Exchange", 3 Making of electronic blackboard /notebook system that is possible, Research Report vol. 2001 No. 122 of Information Processing Society, Incorporated Information Processing Society, Dec. 14, 2001, pp. 33-40.

* cited by examiner

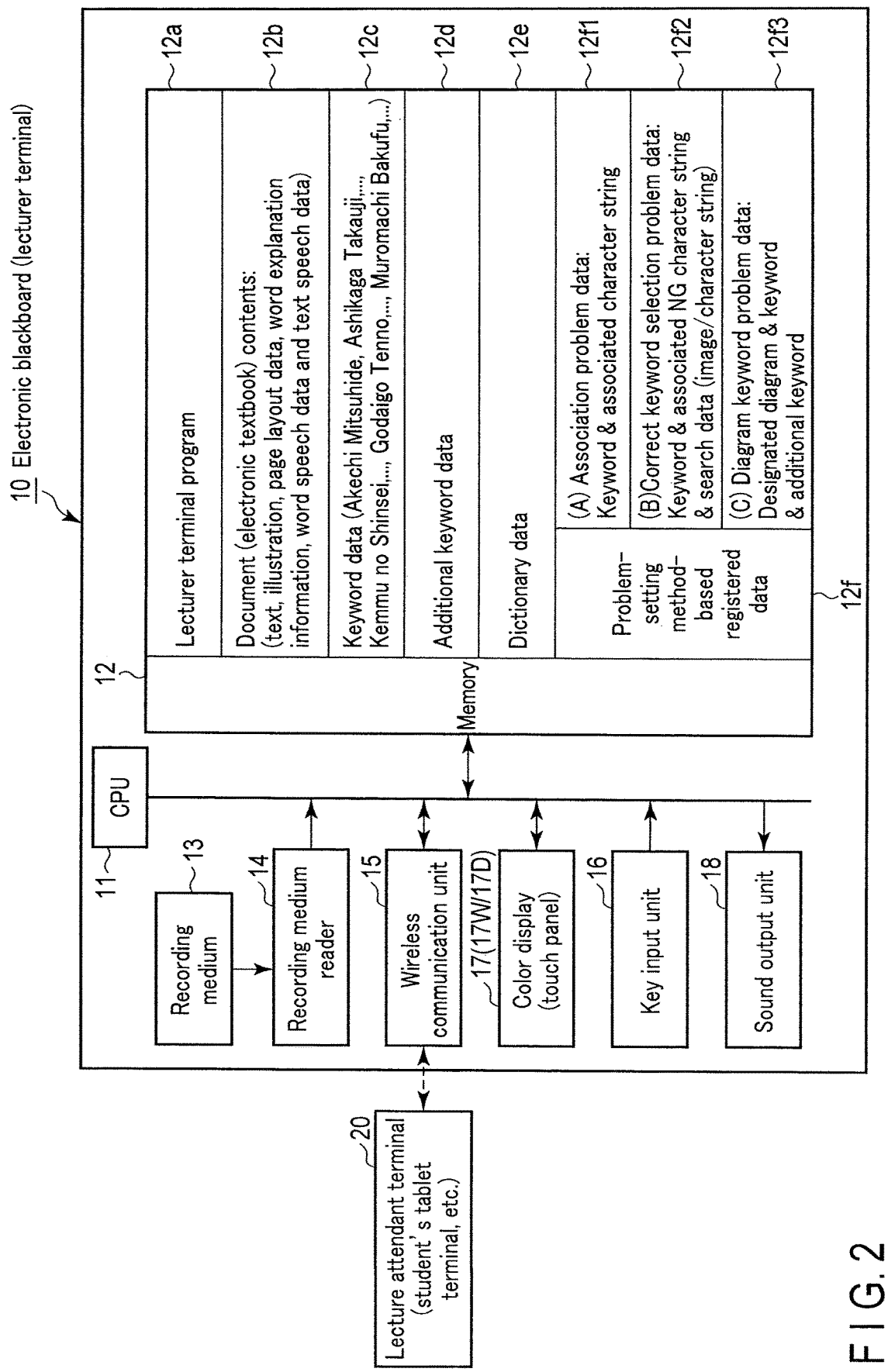
F I G. 2

INFORMATION DISPLAY APPARATUS, INFORMATION DISPLAY METHOD, AND COMPUTER-READABLE RECORDING MEDIUM

CROSS-REFERENCE TO RELATED APPLICATIONS

This application is based upon and claims the benefit of priority from prior Japanese Patent Application No. 2017-055584, filed Mar. 22, 2017, the entire contents of which are incorporated herein by reference.

BACKGROUND OF THE INVENTION

1. Field of the Invention

The present invention relates to an information display apparatus for performing an effective lecture, an information display method, and a computer-readable recording medium.

2. Description of the Related Art

Conventionally, there is proposed a system which performs education or learning by using electronic educational materials.

An e-learning system has been proposed (see, for example, Jpn. Pat. Appln. KOKAI Publication No. 2010-175699). In this system, for example, a learning support server, which is connected to a Web server that provides educational material information and examination problems to terminals of lecture attendants, stores educational material proposal effect information which is obtained by analyzing answer histories of plural lecture attendants. When examination problems that are presented to the lecture attendants require knowledge of other already learned educational material in addition to the educational material learned this time, educational material that is effective to the lecture attendants is selected based on the answer history information for each lecture attendant and the above-described educational material proposal effect information. The selected educational material is reported to the Web server as the next proposed educational material. Thereby, in accordance with the examination results, the next educational material suitable for the lecture attendants can be presented.

Specifically, the conventional e-learning system presents the next educational material suitable for lecture attendants from among the other already learned educational materials, based on the examination results of the test problems prepared in advance. Thereby, knowledge, which was already learned but is considered deficient in lecture attendants, is presented once again. Thereby, a further learning support is provided after the learning of the lecture attendants.

However, the conventional system does not provide a learning support for deepening the understanding of the lecture contents to lecture attendants, by emulating the site of a lesson, a lecture, etc., which is most suitable for education and learning.

Specifically, as regards the examination problems prepared in advance, a problem relating to content that has not yet been learned may be included, not in step with the progress of lectures, or a test is conducted after the end of a series of scheduled lectures. Thus, there is a problem that timely problems, which are in step with the contents of lectures, may not be presented.

BRIEF SUMMARY OF THE INVENTION

According to one embodiment, there is provided an information display apparatus including a processor, the processing being configured to display a character string including a plurality of keywords on a display; to detect a kind of an association operation when the processor accepts designation by a user operation of any one of the keywords displayed on the display and accepts the association operation of related information corresponding to the designated keyword; and to set a problem-setting method with respect to the designated keyword, the problem-setting method corresponding to the detected kind of the association operation.

According to another embodiment, there is provided an information display method including causing a processor to display a character string including a plurality of keywords on a display; causing the processor to detect a kind of an association operation when the processor accepts designation by a user operation of any one of the keywords displayed on the display and accepts the association operation of related information corresponding to the designated keyword; and causing the processor to set a problem-setting method with respect to the designated keyword, the problem-setting method corresponding to the detected kind of the association operation.

According to another embodiment, there is provided a non-transitory recording medium having a program recorded thereon that is executable to control a computer including a display, an input unit and a processor to cause the processor to display a character string including a plurality of keywords on the display; cause the processor to detect a kind of an association operation when the processor accepts designation from the input unit by a user operation of any one of the keywords displayed on the display and accepts the association operation from the input unit of related information corresponding to the designated keyword; and cause the processor to set a problem-setting method with respect to the designated keyword, the problem-setting method corresponding to the detected kind of the association operation.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a block diagram illustrating a configuration of electronic circuitry of the electronic blackboard (lecturer terminal) 10.

DETAILED DESCRIPTION OF THE PREFERRED EMBODIMENTS

Embodiments of the present invention will be described hereinafter with reference to the accompanying drawings.

Figure 1:
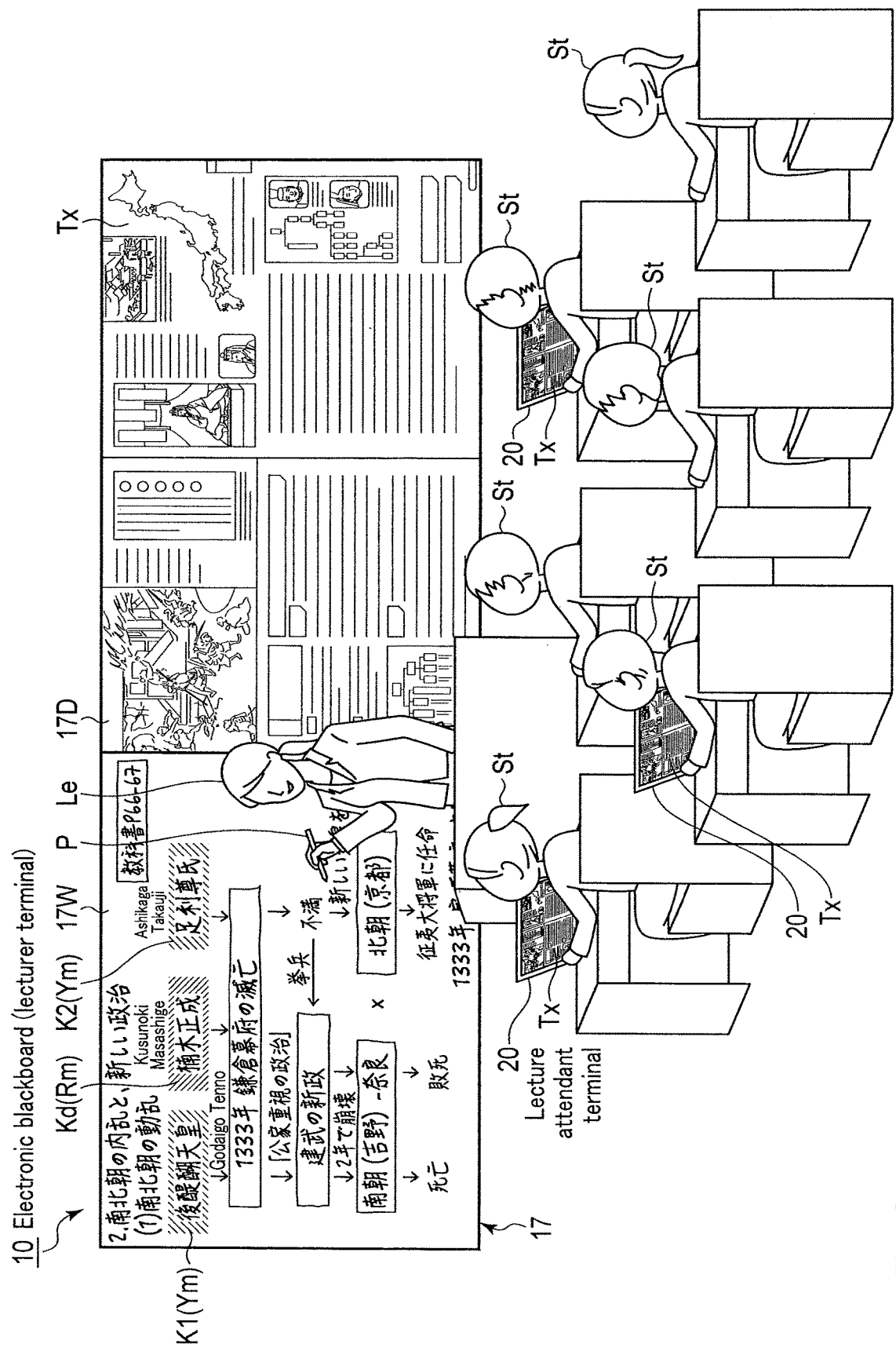
FIG. 1 is a conceptual view illustrating an external appearance structure of an electronic blackboard (lecturer terminal) 10 according to an embodiment of an information display apparatus of the present invention.

FIG. 1 is a conceptual view illustrating an external appearance structure of an electronic blackboard (lecturer terminal) 10 according to an embodiment of an information display apparatus of the present invention.

As illustrated in FIG. 1, the electronic blackboard (lecturer terminal) 10 includes a touch panel (touch position detection device)-equipped color display 17 (17W/17D) having a display screen with such a broadness as to take the place of a blackboard or whiteboard for lectures. For example, the left area of the color display 17 is set as a character input (board writing) area 17W, and the right area thereof is set as an electronic text (textbook) display area 17D.

In the meantime, the electronic blackboard (lecturer terminal) 10 may be composed of a tablet terminal, or a personal computer or the like including a touch panel-equipped display. Display data, which is generated and displayed by the personal computer or the like, may be displayed on a large-screen display device for lectures, on which the character input (board writing) area 17W and electronic text (textbook) display area 17D are set.

Besides, the electronic blackboard (lecturer terminal) 10 may be configured to include a normal blackboard (or whiteboard) (character input (board writing) area 17W) which itself does not have a display function; a large-screen display device (electronic text (textbook) display area 17D) which is juxtaposed with the blackboard (or whiteboard); a pen position sensor which detects a designated position and a movement of a pen P on the blackboard (or whiteboard); an imaging recognition device which captures an image of the blackboard (or whiteboard) and recognizes characters or pictures included in the captured image; and a projector device which generates an image based on the position/locus of the pen P on the blackboard (or whiteboard) detected by the pen position sensor and the characters or pictures on the blackboard (or whiteboard) recognized by the imaging recognition device, and projects and displays this image on the blackboard (or whiteboard).

Hereinafter, the electronic blackboard (lecturer terminal) 10 including the touch panel-equipped color display 17 (17W/17D) will be described.

Data of a page of a text (textbook) Tx of a lecture subject is displayed on the electronic text (textbook) display area 17D of the electronic blackboard (lecturer terminal) 10. A lecturer Le writes on the character input (board writing) area 17W of the electronic blackboard (lecturer terminal) 10 by using the pen P, and gives a lecture on the text (textbook) Tx displayed on the electronic text (textbook) display area 17D.

Each lecture attendant (student or the like) St has a lecture attendant terminal (tablet terminal or the like) 20, and attends a lecture by displaying on the lecture attendant terminal (tablet terminal or the like) 20 the page of the text (textbook) Tx of the lecture subject delivered from the electronic blackboard (lecturer terminal) 10 by wireless communication. Besides, a lecture attendant (student or the like) St, who does not have the lecture attendant terminal (tablet terminal or the like) 20, attends the lecture by opening the corresponding page of a book-format text (textbook).

FIG. 2 is a block diagram illustrating a configuration of electronic circuitry of the electronic blackboard (lecturer terminal) 10.

The electronic blackboard (lecturer terminal) 10 includes a CPU 11 which is a computer. The CPU 11 controls the operations of respective circuitry components according to a lecturer terminal program 12a which is prestored in a memory 12 such as a flash ROM. Incidentally, the lecturer terminal program 12a may be read from an external recording medium 13 such as a memory card by a recording medium reader 14 and stored in the memory 12, or may be downloaded from an external communication device (not shown) via a wireless communication unit 15 and stored in the memory 12.

The memory 12, recording medium reader 14 and wireless communication unit 15 are connected to the CPU 11. In addition, a key input unit 16, the touch panel-equipped color display 17 (17W/17D) and a sound output unit 18 are connected to the CPU 11.

Besides, in the memory 12, a document (electronic textbook) content area 12b, a keyword data area 12c, an additional keyword data area 12d, a dictionary data area 12e and a problem-setting method-based registered data area 12f are secured.

In the document (electronic textbook) content area 12b, content data of each of various kinds of electronic textbooks (texts) Tx is stored. The content data includes text data, illustration data and page layout data. In the case of a language text, the content data further includes word explanation information data, word speech data and text speech data.

The keyword data area 12c stores, as keywords, data of character strings corresponding to, for example, important persons and important matters, which are distinguished in bold letters and included in the electronic textbooks (texts) Tx stored in the document (electronic textbook) content area 12b. These keywords are stored by being associated with corresponding pages, chapters or sections (parts of a chapter) in the electronic textbooks (texts) Tx. The additional keyword data area 12d stores, as additional keywords, character strings designated as new keywords, for example, in accordance with a user (lecturer) operation on the character input (board writing) area 17W. These additional keywords are stored by being associated with pages, chapters or sections (parts of a chapter) in the electronic textbooks (texts) Tx, in which the additional keywords are included.

The dictionary data area 12e stores dictionary data in which various entry words and character strings or images, which are explanatory information of the entry words, are mutually associated, for example, with respect to each of plural kinds of lecture subjects.

Besides, the following configuration may be adopted. Specifically, the content data of various electronic textbooks (texts) Tx stored in the document (electronic textbook) content area 12b, the data of the keywords stored in the keyword data area 12c and the dictionary data stored in the dictionary data area 12e may be downloaded and acquired from a server apparatus on a communication network (not shown) such as the Internet via communication means such as a network communication device and wireless communication unit 15, in accordance with the necessity in connection with the operation of the electronic blackboard (lecturer terminal) 10 according to the lecturer terminal program 12a.

The problem-setting method-based registered data area 12f registers and stores problem data based on problem-setting methods, namely (A) association problem data 12f1, (B) correct keyword selection problem data 12f2 and (C) diagram keyword problem data 12f3, which are generated in accordance with the user (lecturer) operation.

Figure 6:
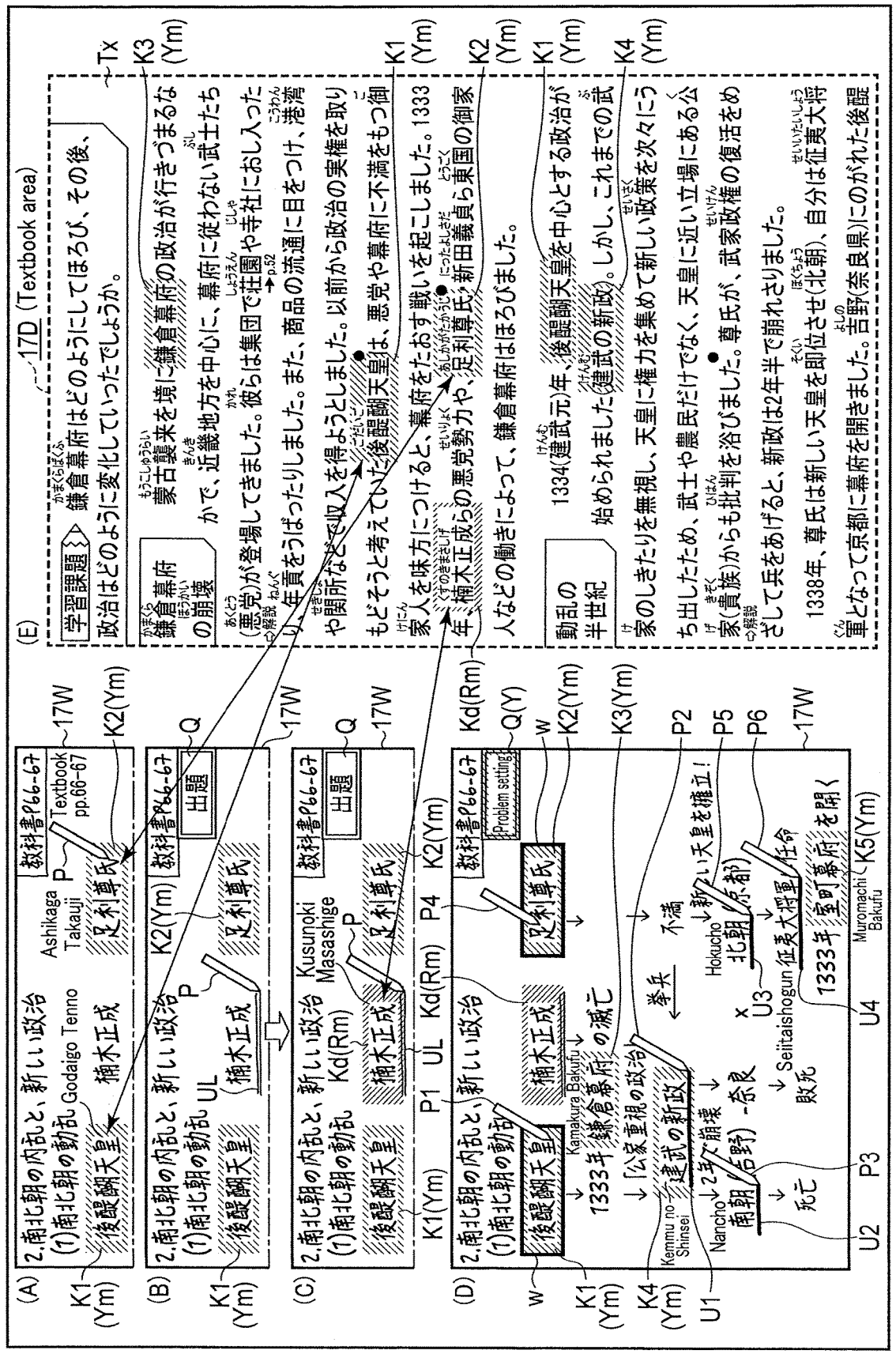
FIG. 6 is a view illustrating a display operation (part 1) of lecture contents corresponding to a user (lecturer) operation according to the lecturer terminal process (part 1) of the electronic blackboard (lecturer terminal) 10.

As the (A) association problem data 12f1, for example, as illustrated in part (D) of FIG. 6, a keyword [Godaigo Tenno] (Emperor Godaigo) and other character strings "Kemmu no Shinsei" (the Kemmu Restoration; the personal government by Emperor Godaigo) and "Nancho" (the Southern Dynasty), which are designated by the user (lecturer) operation on the character input (board writing) area 17W, are registered as combinatorial data between the keyword [Godaigo Tenno] and associated character strings "Kemmu no Shinsei" and "Nancho".

Figure 8:
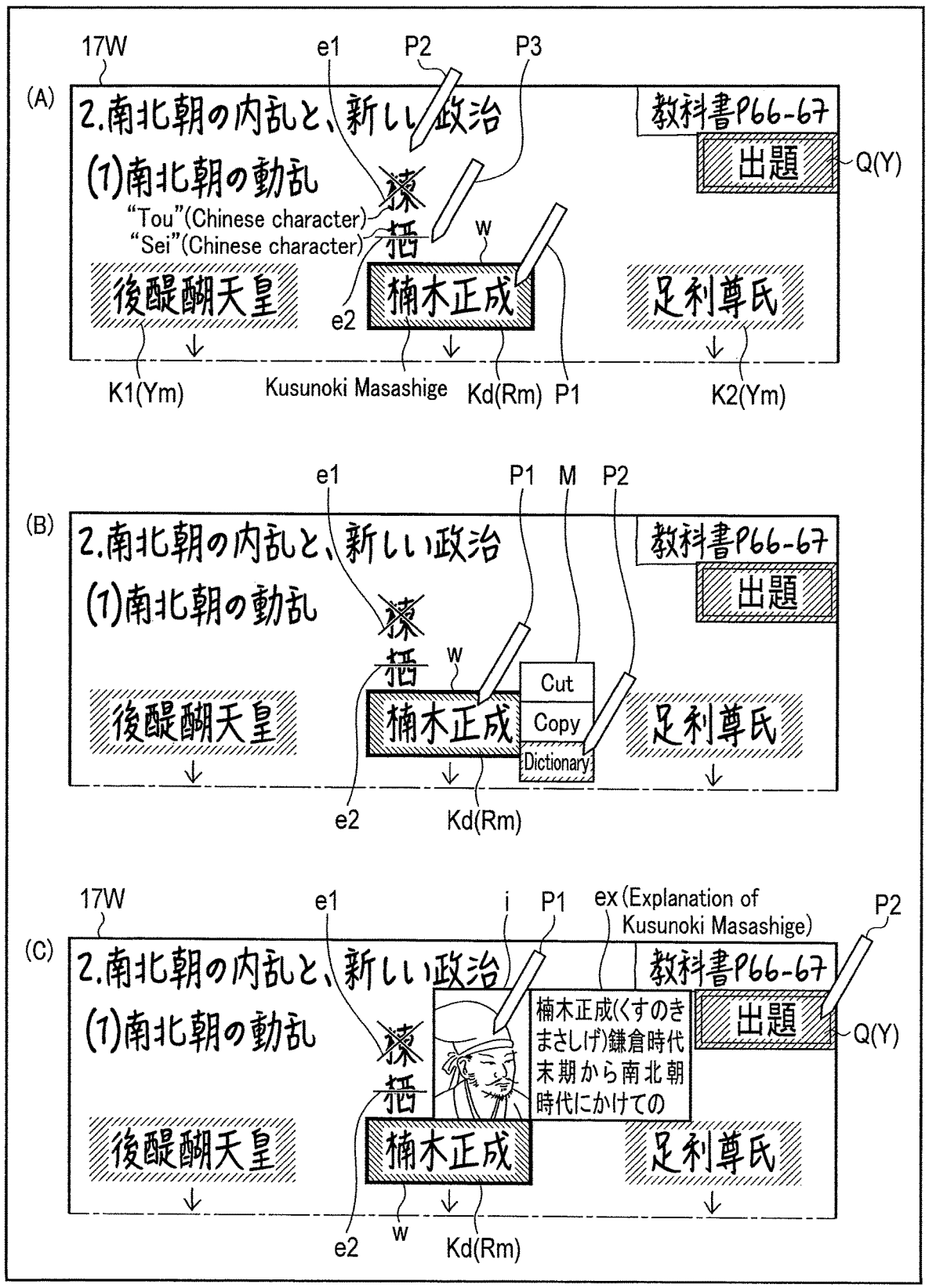
FIG. 8 is a view illustrating the display operation (part 2) of lecture contents corresponding to the user (lecturer) operation according to the lecturer terminal process (part 1) of the electronic blackboard (lecturer terminal) 10.

As the (B) correct keyword selection problem data 12f2, for example, as illustrated in part (A) of FIG. 8, a keyword [Kusunoki Masashige] (the full name of a warlord in the period of the Northern and Southern Dynasties), which was designated by the user (lecturer) operation on the character input (board writing) area 17W, and characters (character strings) "Tou" (an erroneous Chinese character of part "Kusu" of the surname "Kusunoki" of "Kusunoki Masashige") and "Sei" (another erroneous Chinese character of part "Kusu" of the surname "Kusunoki"), which were input in association with part the "Kusu" of the surname "Kusunoki" included in the keyword [Kusunoki Masashige] and were deleted (by mark "-" or "x"), are registered as combinatorial data between the keyword [Kusunoki Masashige] and associated NG character strings "Tou" and "Sei". In the meantime, when the (B) correct keyword selection problem data 12f2 is registered, a dictionary search may be executed, for example, as illustrated in parts (B) and (C) of FIG. 8. In this case, search result data (character string ex/image i) of the dictionary search of the designated keyword [Kusunoki Masashige] is registered as associated search data by being further combined with the keyword [Kusunoki Masashige] and associated NG character strings "Tou" and "Sei".

Figure 10:
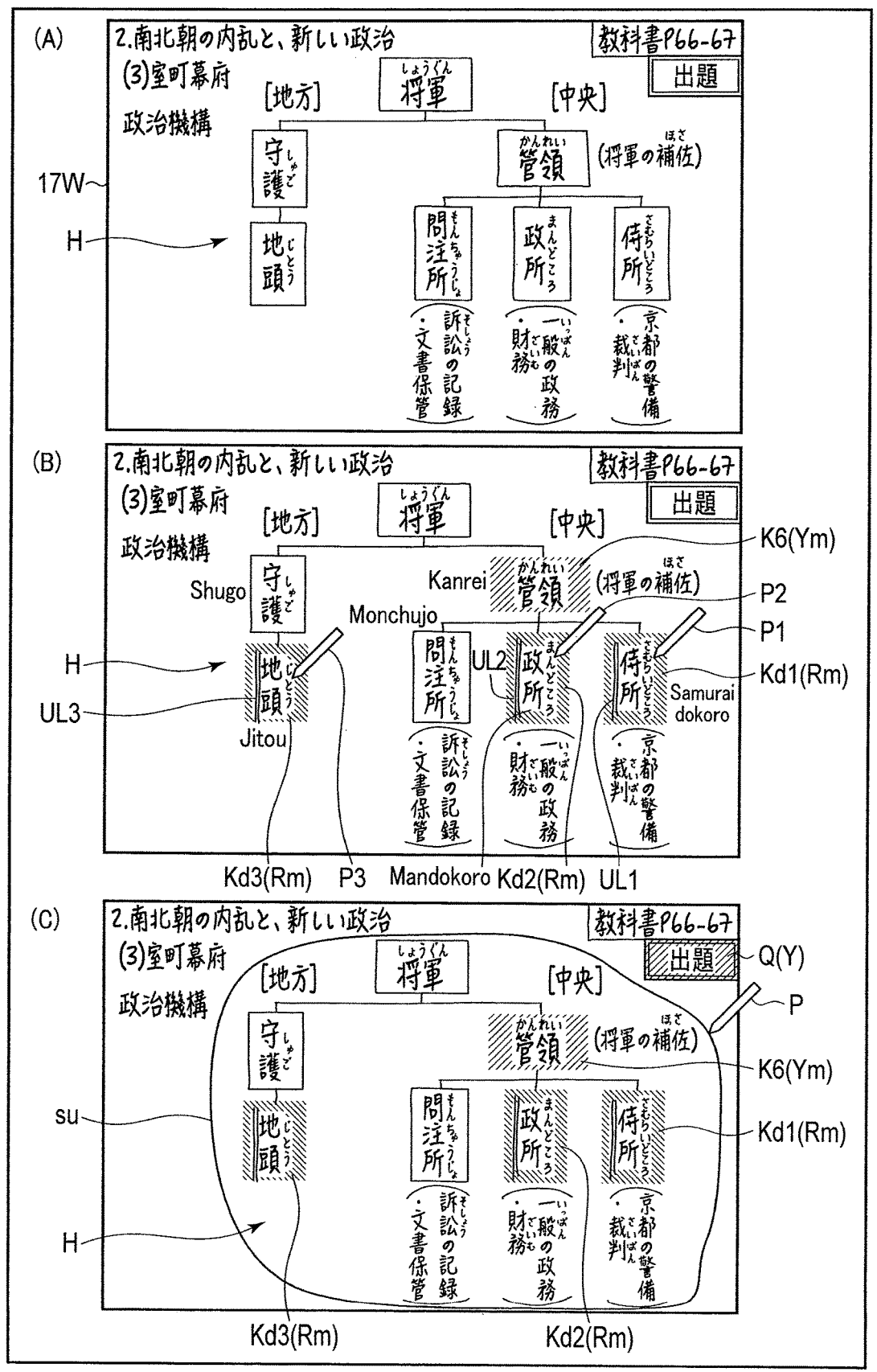
FIG. 10 is a view illustrating the display operation (part 3) of lecture contents corresponding to the user (lecturer) operation according to the lecturer terminal process (part 1) of the electronic blackboard (lecturer terminal) 10.

As the (C) diagram keyword problem data 12f3, for example, as illustrated in part (C) of FIG. 10, a diagram H, which was designated in accordance with the user (lecturer) operation (a surrounding operation (su)) on the character input (board writing) area 17W, and a keyword [Kanrei] (a shogunal deputy) and additional keywords "Samuraidokoro" (the Board of Retainers), "Mandokoro" (an administrative office) and "Jitou" (a local land administrator), which are included in the diagram H, are registered as combinatorial data between the designated diagram H, keyword [Kanrei] and additional keywords "Samuraidokoro", "Mandokoro" and "Jitou".

In the electronic blackboard (lecturer terminal) 10 with the above-described configuration, the CPU 11 controls the operations of the respective circuitry components according to the instructions described in the lecturer terminal program 12a, and the software and hardware cooperate to realize a function of generating problem data corresponding to lecture contents and a problem-setting function of the problem data, which will be described in the following operational description.

Next, the operation of the electronic blackboard (lecturer terminal) 10 with the above-described configuration will be described.

Figure 3:
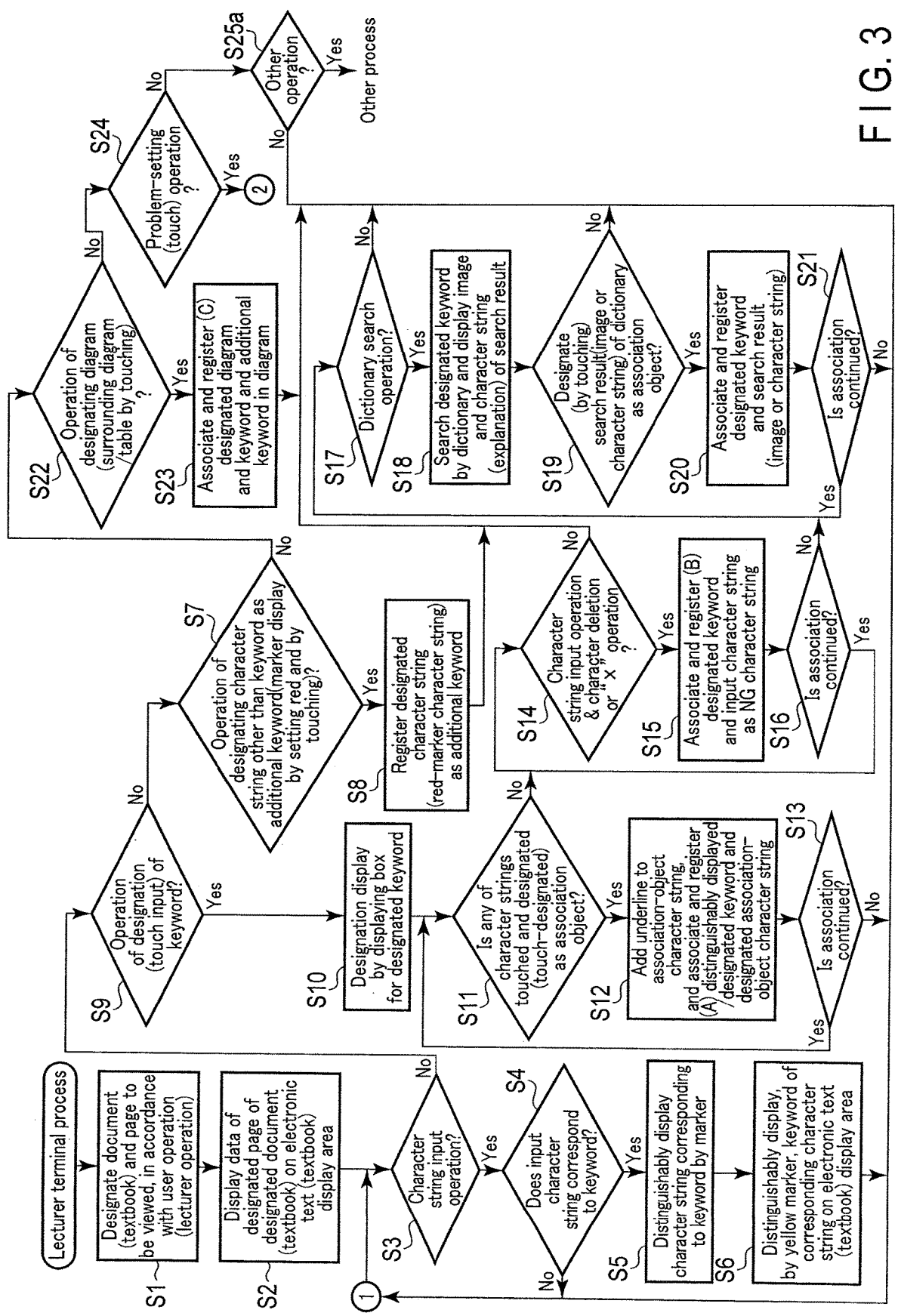
FIG. 3 is a flowchart illustrating a lecturer terminal process (part 1) of the electronic blackboard (lecturer terminal) 10.
Figure 4:
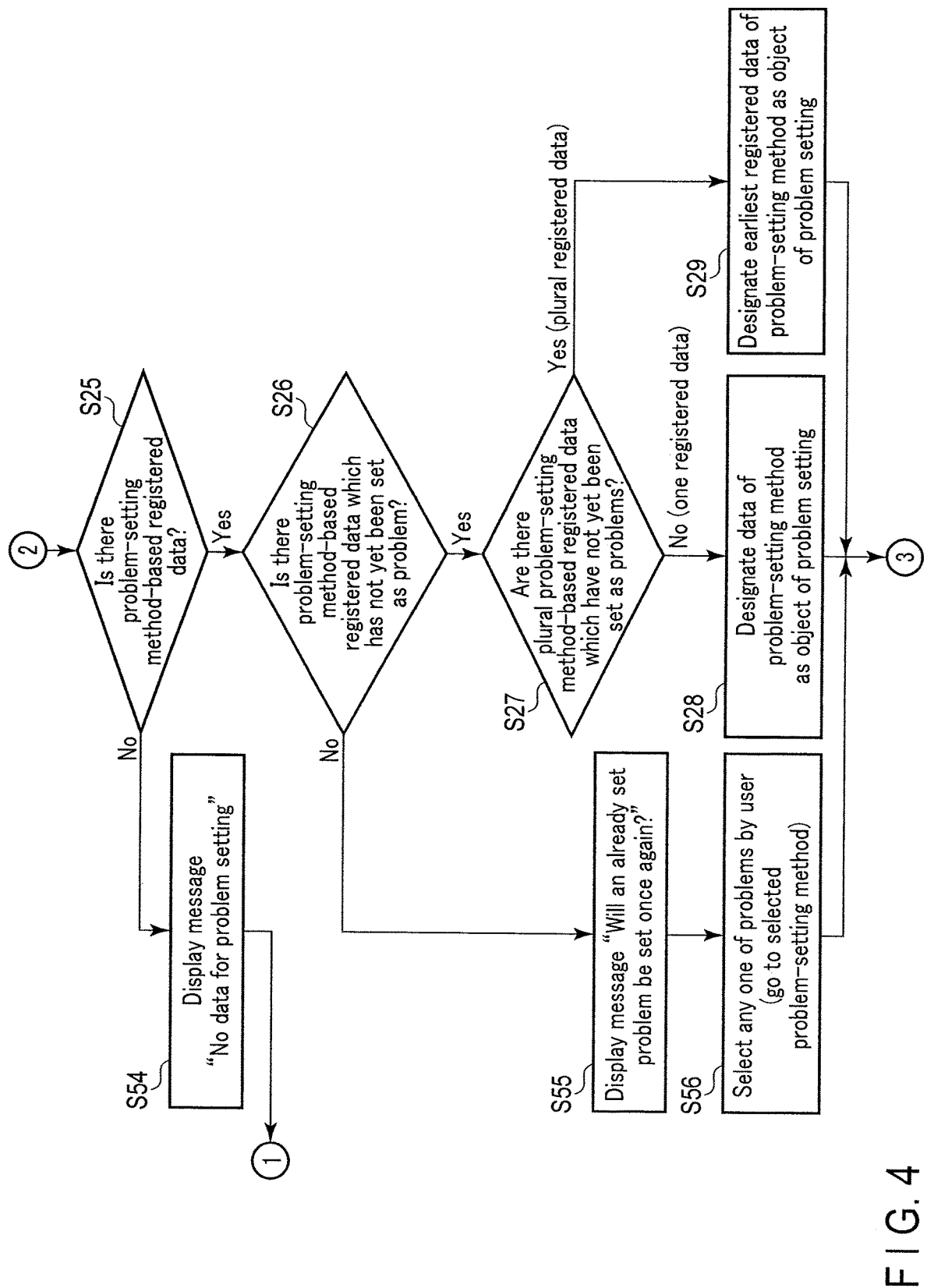
FIG. 4 is a flowchart illustrating the lecturer terminal process (part 2) of the electronic blackboard (lecturer terminal) 10.
Figure 5:
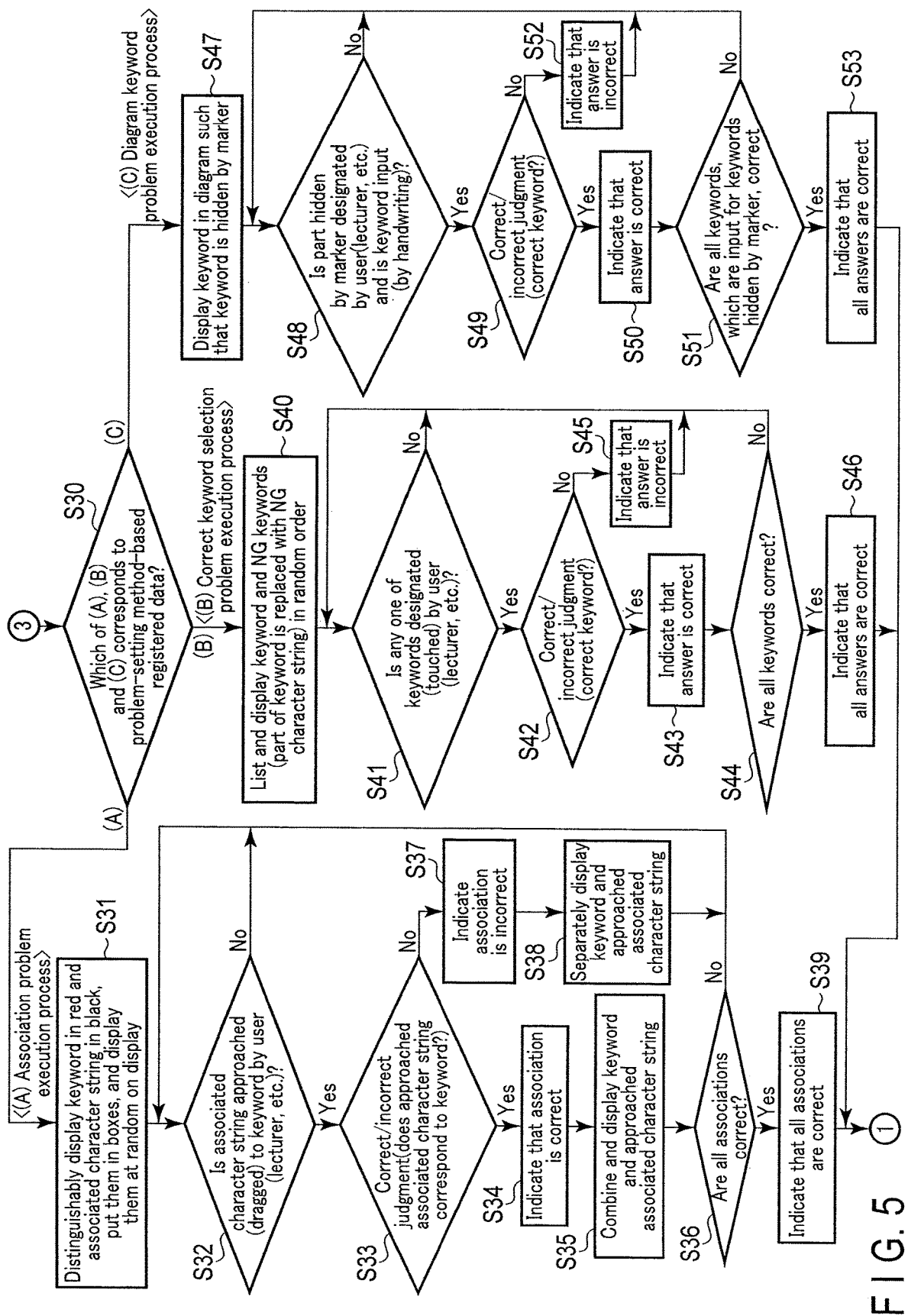
FIG. 5 is a flowchart illustrating the lecturer terminal process (part 3) of the electronic blackboard (lecturer terminal) 10.

FIG. 3, FIG. 4 and FIG. 5 are flowcharts illustrating a lecturer terminal process (part 1, part 2 and part 3) of the electronic blackboard (lecturer terminal) 10.

FIG. 6 is a view illustrating a display operation (part 1) of lecture contents corresponding to a user (lecturer) operation according to the lecturer terminal process (part 1) of the electronic blackboard (lecturer terminal) 10.

To begin with, in accordance with the user (lecturer) operation of the key input unit 16, a document (textbook) and pages (pp. 66-67 of "Junior High School History"), which are to be viewed in the present lecture), are designated (step S1). Then, data Tx of the designated pages (pp. 66-67) of the designated document (textbook) "Junior High School History" is read from the document (electronic textbook) content area 12b in the memory 12, and is displayed on the electronic text (textbook) display area 17D of the touch panel-equipped color display 17, as illustrated in FIG. 1 (step S2).

Then, the lecturer Le gives a lecture while writing on the character string input (board writing) area 17W of the touch panel-equipped color display 17 by using the pen P (step S3 (Yes)).

Subsequently, a character string, which was input in accordance with the board writing on the character string input (board writing) area 17W by the lecturer Le, is character-recognized, and it is judged whether the character string corresponds to any one of the keywords stored in the keyword data area 12c in the memory 12 (step S4).

Here, as illustrated in part (A) of FIG. 6, if it is judged that character strings "Godaigo Tenno" and "Ashikaga Takauji" (a warlord who established the Muromachi shogunate) correspond to keywords (step S4 (Yes)), the keywords [Godaigo Tenno] K1 and [Ashikaga Takauji] K2 are distinguishably displayed by a yellow marker Ym (step S5).

Then, as illustrated in part (E) of FIG. 6, the keywords [Godaigo Tenno] K1 and [Ashikaga Takauji] K2, which are included in the data Tx of the designated document (textbook) "Junior High School History" (pp. 66-67) displayed on the electronic text (textbook) display area 17D, are also distinguishably displayed by a yellow marker Ym (step S6).

At this time, that part of the designated document (textbook) "Junior High School History" (pp. 66-67), which includes the keywords [Godaigo Tenno] K1 and [Ashikaga Takauji] K2 that were input in accordance with the board writing on the character string input (board writing) area 17W, may be displayed in enlarged scale by another window on the electronic text (textbook) display area 17D, so that the lecture attendants st can easily view this part.

Here, as illustrated in part (B) of FIG. 6, the following case is assumed. In the character string input (board writing) area 17W, with a double underline UL being selected from a setup menu (not shown) of marker colors, a character string "Kusunoki Masashige" that is an object of an additional keyword was designated by a pen P from among the character strings other than the keywords [Godaigo Tenno] K1 and [Ashikaga Takauji] K2 which are distinguishably displayed by the yellow marker Ym (step S7 (Yes)). In this case, as illustrated in part (C) of FIG. 6, this designated character string "Kusunoki Masashige" is distinguishably displayed by a red marker Rm as an additional keyword [Kusunoki Masashige] Kd, and registered and stored in the additional keyword data area 12d in the memory 12 (step S8). At this time, the additional keyword [Kusunoki Masashige] Kd, which is included in the data Tx of the designated document (textbook) "Junior High School History" (pp. 66-67) displayed on the electronic text (textbook) display area 17D, is also distinguishably displayed by a red marker Rm.

Thereafter, as illustrated in part (D) of FIG. 6, the following case is assumed. In the character string input (board writing) area 17W, while the lecture is being given, for example, the lecturer Le first touched and designated the keyword [Godaigo Tenno] K1 by a pen P1 by an operation of indicating an important person and an associated matter (step S9 (Yes)). In this case, a box w is added to the designated keyword [Godaigo Tenno] K1, and the keyword [Godaigo Tenno] K1 is designated and displayed (step S10).

Subsequently, a character string "Kemmu no Shinsei" of a keyword K4 written on the character input (board writing) area 17W is touched and designated as a character string that is to be associated with the designated keyword [Godaigo Tenno] K1 as indicated by a pen P2. In this case, the kind (A) of an association operation, that is, "(A) association operation between a designated keyword and a touched character string", is detected (step S11 (Yes)). An underline U1 is added to the designated character string "Kemmu no Shinsei" that is the object of association, and the designated character string "Kemmu no Shinsei" is distinguishably displayed. Then, the designated keyword [Godaigo Tenno] K1 and the designated character string "Kemmu no Shinsei" that is the object of association are associated, and are registered and stored as the (A) association problem data 12/1 between the designated keyword and touched character string in the problem-setting method-based registered data area 12f (step S12).

Similarly, if another character string "Nancho" written on the character input (board writing) area 17W is touched and designated as a character string that is to be associated with the designated keyword [Godaigo Tenno] K1 as indicated by a pen P3 (step S13 (Yes)→S11 (Yes)), an underline U2 is added to the designated character string "Nancho" that is the object of association, and the designated character string "Nancho" is distinguishably displayed. Then, the designated keyword [Godaigo Tenno] K1 and the designated character string "Nancho" that is the object of association are associated, and are registered and stored as the (A) association problem data 12/1 in the problem-setting method-based registered data area 12f (step S12).

Furthermore, like the above, the keyword [Ashikaga Takauji] K2 is touched and designated as indicated by a pen P4, and is designated and displayed by a box w (step S9 (Yes) S10). Thereafter, as indicated by a pen P5 and a pen P6, other character strings "Hokucho" (the Northern Dynasty) and "Seiitaishogun" (a shogun) are designated as character strings that are objects of association, and are distinguishably displayed by underlines U3 and U4. Then, the designated keyword [Ashikaga Takauji] K2 and the designated character strings "Hokucho" and "Seiitaishogun" that are the objects of association are associated, and are registered and stored as the (A) association problem data 12/1 in the problem-setting method-based registered data area 12f (step S11 to step S13).

If the (A) association problem data 12/1, in which the designated keyword Kn (n is a natural number) and the associated character string are combined, is registered, a problem-setting button Q on the character string input (board writing) area 17W is distinguishably displayed in yellow Y, and it is indicated that a problem of the (A) association problem data 12/1 can be set.

Figure 7:
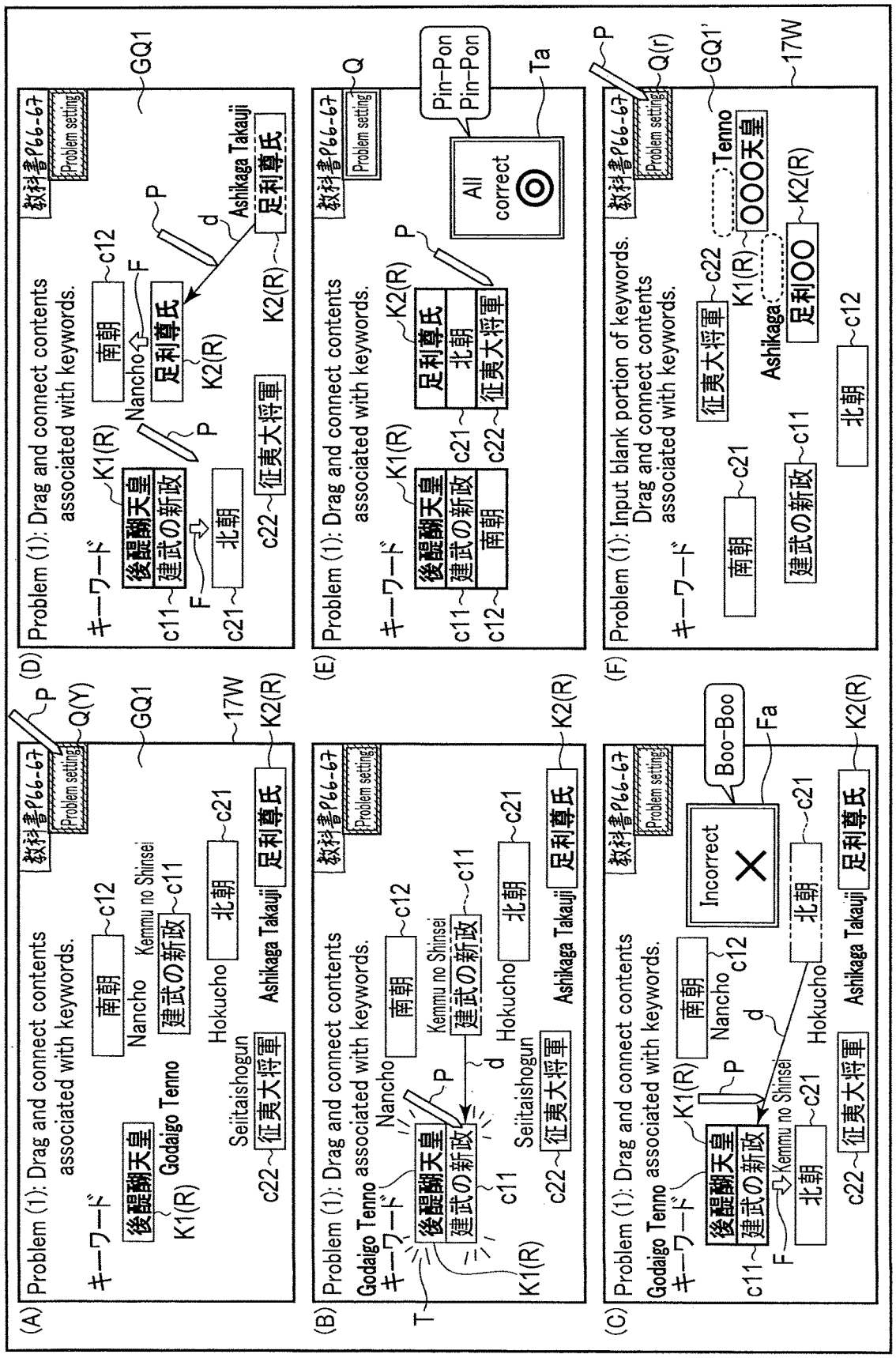
FIG. 7 is a view illustrating a problem-setting operation of (A) association problem data 12/1 according to the lecturer terminal process (parts 2 and 3) of the electronic blackboard (lecturer terminal) 10.

FIG. 7 is a view illustrating a problem-setting operation of the (A) association problem data 12/1 according to the lecturer terminal process (parts 2 and 3) of the electronic blackboard (lecturer terminal) 10.

As illustrated in part (A) of FIG. 7, if the problem-setting button Q, which is distinguishably displayed in yellow Y indicating that the problem can be set, is touch-operated on the character string input (board writing) area 17W (step S24 (Yes)), it is judged whether there is problem data registered in the problem-setting method-based registered data area 12f (step S25). If it is judged that the (A) association problem data 12/1 is registered (step S25 (Yes)), it is judged whether this problem data is problem data which has not yet been set as a problem (step S26).

If it is judged that there is problem data which has not yet been set as a problem (step S26 (Yes)), it is judged whether there are a plurality of problem data which have not yet been set (step S27).

If it is judged that there are a plurality of problem data which have not yet been set (step S27 (Yes)), the earliest registered problem data is designated as the problem to be set (step S29). On the other hand, if it is judged that the problem data which has not yet been set is not plural but is single (step S27 (No)), this one problem data which has not yet been set is designated as the problem to be set (step S28).

Then, it is judged whether the problem data designated as the object of the problem to be set is the (A) association problem data 12/1, or (B) correct keyword selection problem data 12/2, or (C) diagram keyword problem data (step S30).

If it is judged that the problem data designated as the object of the problem to be set is the (A) association problem data 12/1 ([Godaigo Tenno]; "Kemmu no Shinsei"; "Nancho"/[Ashikaga Takauji]; "Hokucho"; "Seiitaishogun") registered according to the user operation in part (D) of FIG. 6 (step S30 (A)), the [Godaigo Tenno] K1 and [Ashikaga Takauji] K2, which are keywords registered as this (A) association problem data 12/1, are distinguished by red characters R, and the associated character strings "Kemmu no Shinsei" c11, "Nancho" c12, "Hokucho" c21 and "Seiitaishogun" c22 are distinguished by black characters. These keywords and associated character strings are put in boxes, and an association problem screen GQ1, on which these keywords and associated character strings in the boxes are disposed at random on the display, is displayed together with a problem-setting message "Problem (1): Drag and connect contents associated with the keywords" (step S31).

At this time, the display data written on the board during the lecture, which has been displayed on the character input (board writing) area 17W as illustrated in part (D) of FIG. 6, is temporarily saved in a board-writing data saving area (not shown) in the memory 12.

On the association problem screen GQ1, for example, it is judged that, by an operation of a user (lecture attendant st) designated by the lecturer Le, any one of the associated character strings "Kemmu no Shinsei" c11, "Nancho" c12, "Hokucho" c21 and "Seiitaishogun" c22 of black characters was dragged (d) and approached to (associated with) the keyword [Godaigo Tenno] K1 or [Ashikaga Takauji] K2 of red characters R (step S33 (Yes)). In this case, it is judged whether this association is correct or not, according to whether the approached associated character string is registered as the character string that is associated with the keyword Kn to which the associated character string was approached (step S33).

For example, as illustrated in part (B) of FIG. 7, if the associated character string "Kemmu no Shinsei" c11 of black letters is dragged by the pen P and approached to the keyword [Godaigo Tenno] K1 of red letters R (step S32 (Yes)), sound "Pin-Pon" indicating that the association is correct is output from the sound output unit 18 (step S33 (Yes)→step S34). In addition, the keyword [Godaigo Tenno] K1 and the approached associated character string "Kemmu no Shinsei" c11 are combined (T) and displayed (step S35).

On the other hand, for example, as illustrated in part (C) of FIG. 7, if the associated character string "Hokucho" c21 of black letters is dragged by the pen P and approached to the keyword [Godaigo Tenno] K1 of red letters R (step S32 (Yes)), sound "Boo-Boo" indicating that the association is incorrect is output from the sound output unit 18, and a message "Incorrect (x)" Fa indicating that the association is incorrect is displayed (step S33 (No)→step S37). The approached associated character string "Hokucho" c21 is displayed separately from the keyword [Godaigo Tenno] K1, as indicated by an arrow F (step S38).

Similarly, as illustrated in part (D) of FIG. 7, if the keyword [Ashikaga Takauji] K2 of red letters R is dragged (d) by the pen P and approached to the associated character string "Nancho" c12 of black letters (step S32 (Yes)), sound "Boo-Boo" indicating that the association is incorrect is output, and a message "Incorrect (x)" Fa indicating that the association is incorrect is displayed (step S33 (No)→step S37). The associated character string "Nancho" c12, to which the keyword [Ashikaga Takauji] K2 is approached, is separately displayed, as indicated by an arrow F (step S38).

In this manner, on the association problem screen GQ1, if the operation is performed to drag (d) and approach (associate) the keyword K1, K2 of red letters R and the associated character string c11, c12, c21, c22 by the pen P, the keyword Kn and associated character string cnm (n, m=a natural number), which are associated and registered as the (A) association problem data 12/1, are combined (T) and displayed, and a notification of a correct answer is made. Conversely, the keyword Kn and associated character string cnm, which are not associated or registered as the (A) association problem data 12/1, are separately displayed (arrow F), and a notification of an incorrect answer is made. Thus, the user (lecture attendant st) can easily and enjoyably learn whether the association between the keyword Kn and associated character string cnm is correct or not.

Thereafter, as illustrated in part (E) of FIG. 7, if all associations between the keywords K1, K2 and the associated character strings c11, c12, c21, c22 are correct (step S36 (Yes)), sound "Pin-Pon, . . . " indicating that all associations are correct is output, and a message "All correct ☺" Ta indicating that all associations are correct is displayed (step S39).

In the case of the second and following problem settings with respect to the problem setting of the (A) association problem data 12/1, the following configuration may be adopted. As illustrated in part (F) of FIG. 7, an association problem screen GQ1' may be displayed. For example, a number of characters, which corresponds to the number of times of problem setting, are made blank among the characters which constitute the character string of the keyword Kn. Thereby, the lecture attendant st is prompted to input (for example, by the pen P) the blank portion of the keyword Kn, and then the lecture attendant st is prompted to perform the operation of approaching (associating) the keyword Kn and associated character string cnm. Thus, in this configuration, the level of the content of the problem setting is gradually raised.

Besides, when the problem of the (A) association problem data 12/1 is set on the character input (board writing) area 17W, if the pages of the text (textbook) Tx of the subject of the lecture are kept displayed on the electronic text (textbook) display area 17D, the user (lecture attendant st) can refer to these pages as a hint.

Accordingly, in the course of giving the lecture while writing on the character input (board writing) area 17W, the lecturer Le may simply perform the operation of designating and emphasizing the important keyword Kn and the character string cnm of the matter or the like relating to the keyword Kn. Thereby, the (A) association problem data 12/1 corresponding to the contents of the lecture can automatically be generated and registered. In addition, based on the association problem screen GQ1 on which the problem is set based on the (A) association problem data 12/1, the lecture attendant st can perform timely learning in accordance with the content of the lecture by the lecturer Le with respect to the important keyword and related character string.

FIG. 8 is a view illustrating the display operation (part 2) of lecture contents corresponding to the user (lecturer) operation according to the lecturer terminal process (part 1) of the electronic blackboard (lecturer terminal) 10.

As illustrated in part (A) of FIG. 8, an additional keyword [Kusunoki Masashige] is distinguishably displayed by a red marker Rm on the character input (board writing) area 17W. In this state, if the keyword [Kusunoki Masashige] is touched and designated as indicated by a pen P1 (step S9 (Yes)), a box w is added to the designated keyword [Kusunoki Masashige] Kd, and the keyword [Kusunoki Masashige] Kd is designated and displayed (step S10).

Here, as regards the character (Chinese character) of "Kusu" of the character string of the designated keyword [Kusunoki Masashige] Kd, the lecturer Le to teaches the lecture attendants st that characters (Chinese characters) "Tou" (an erroneous Chinese character of part "Kusu" of the surname "Kusunoki" of "Kusunoki Masashige") and "Sei" (another erroneous Chinese character of part "Kusu" of the surname "Kusunoki") are mistakable characters of "Kusu" of "Kusunoki Masashige". For this purpose, the lecturer Le inputs the erroneous Chinese character "Tou" at a position near the Chinese character "Kusu", and adds a delete mark "x" e1 to the Chinese character "Tou", as indicated by a pen P2 (step S14 (Yes)).

Then, as regards the designated keyword [Kusunoki Masashige] Kd, the input erroneous Chinese character "Tou" is associated as an NG character (character string), and is registered and stored as the (B) correct keyword selection problem data 12/2 in the problem-setting method-based registered data area 12f (step S15).

Subsequently, if the lecturer Le inputs the erroneous Chinese character "Sei" and adds a delete mark "-" e2 to the Chinese character "Sei", as indicated by a pen P3, the kind (B) of an association operation, that is, "(B) association operation between a designated keyword and an input substitute character string (erroneous character string)", is detected (step S16 (Yes)→S14 (Yes))). The input erroneous Chinese character "Sei" is also associated as an NG character (character string) with the designated keyword [Kusunoki Masashige] Kd, and is registered and stored as the (B) association problem data between the designated keyword and substitute character string (correct keyword selection problem data) 12/2 (step S15).

Furthermore, as illustrated in part (B) of FIG. 8, if the designated keyword [Kusunoki Masashige] Kd is touched for a long time of, e.g. two seconds or more, and designated as indicated by a pen P1, an operation menu [Cut/Copy/Dictionary] M relating to this designated keyword [Kusunoki Masashige] Kd is displayed. If [Dictionary] in this operation menu [Cut/Copy/Dictionary] M is touched and designated as indicated by a pen P2, it is judged that a dictionary search operation is executed (step S17 (Yes)). Then, as illustrated in part (C) of FIG. 8, explanatory information of an entry word corresponding to the designated keyword [Kusunoki Masashige] Kd is searched from the dictionary data stored in the dictionary data area 12e, and an image i of the explanation of the search result and a character string ex of the explanation are displayed (step S18).

Here, if the image i (or character string ex) of the explanation of the dictionary search result is designated as indicated by a pen P1 (step S19 (Yes)), the designated image i (or character string ex) is further registered and stored as association search data that is associated with the designated keyword [Kusunoki Masashige] Kd and the associated NG characters (strings) "Tou" and "Sei", which have been already registered in step S15 as the (B) correct keyword selection problem data 12/2 (step S20).

Moreover, if other search result data of the dictionary search relating to the designated keyword [Kusunoki Masashige] Kd is to be registered as the associated search data (step S21 (Yes)), the keyword [Kusunoki Masashige] Kd is touched for a long time in the same manner as described above, and the dictionary search operation is performed (step S17).

If the (B) correct keyword selection problem data 12/2, in which the designated keyword [Kusunoki Masashige] Kd, associated NG character strings "Tou" and "Sei" and associated search data (image i) are combined, is thus registered, the problem-setting button Q on the character string input (board writing) area 17W is distinguishably displayed in yellow Y, and it is indicated that the problem can be set.

Figure 9:
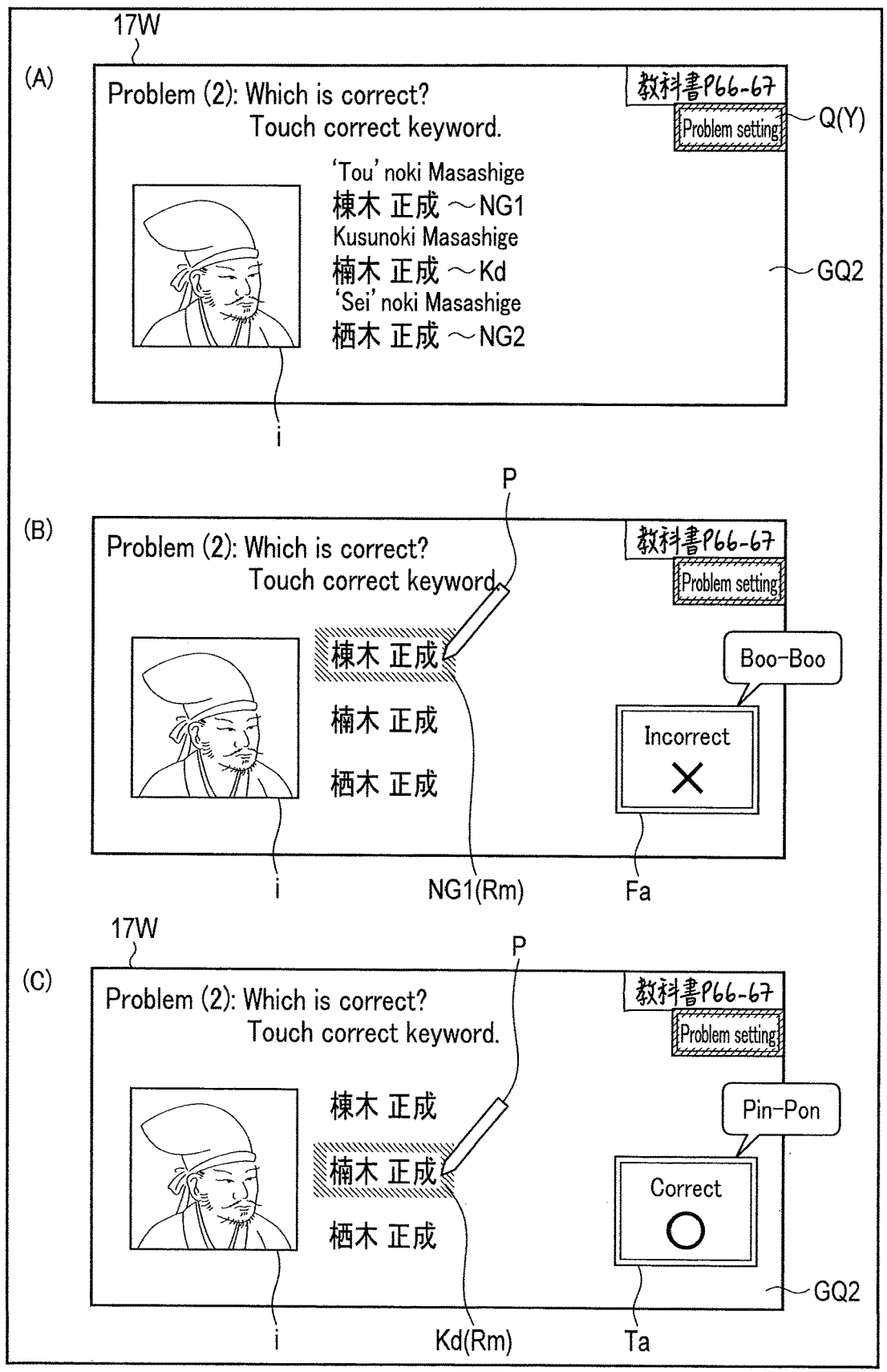
FIG. 9 is a view illustrating a problem-setting operation of (B) correct keyword selection problem data 12/2 according to the lecturer terminal process (parts 2 and 3) of the electronic blackboard (lecturer terminal) 10.

FIG. 9 is a view illustrating the problem-setting operation of the (B) correct keyword selection problem data 12/2 according to the lecturer terminal process (parts 2 and 3) of the electronic blackboard (lecturer terminal) 10.

As indicated by a pen P2 in part (B) of FIG. 8, if the problem-setting button Q, which is distinguishably displayed in yellow Y indicating that the problem can be set, is touch-operated on the character string input (board writing) area 17W (step S24 (Yes)), the process of steps S25 to S29 is executed in the same manner as described above, and one of the problem data, which are registered and stored in the problem-setting method-based registered data area 12f and have not yet been set, is designated as the object of the problem that is to be set.

Here, if it is judged that the problem data designated as the problem to be set is the (B) correct keyword selection problem data 12/2 (keyword [Kusunoki Masashige]/associated NG characters (strings) "Tou" and "Sei"/associated search data (image i)) which was registered according to the user operation in parts (A) to (C) of FIG. 8 (step S30 (B)), a correct keyword selection problem screen GQ2 is generated, as illustrated in part (A) of FIG. 9. In the correct keyword selection problem screen GQ2, the keyword [Kusunoki Masashige] Kd, NG keyword "'Tou'noki Masashige" NG1, and NG keyword "'Sei'noki Masashige" NG2 are listed in a random order on the character input (board writing) area 17W. The keyword [Kusunoki Masashige] Kd is registered as the (B) correct keyword selection problem data 12/2. In the respective NG keywords NG1 and NG2, the Chinese character "Kusu" of the keyword [Kusunoki Masashige] Kd is replaced with the NG characters (strings) "Tou" and "Sei", respectively. A problem-setting message "Problem (2): Which is correct? Touch correct keyword." is additionally displayed. On the correct keyword selection problem screen GQ2, the associated search data (image i) of the keyword [Kusunoki Masashige] Kd, which is registered as the (B) correct keyword selection problem data 12/2, is also additionally displayed (step S40).

At this time, the display data written on the board during the lecture, which has been displayed on the character string input (board writing) area 17W as illustrated in part (C) of FIG. 8, is temporarily saved in the board-written data saving area (not shown) in the memory 12.

In addition, if it is judged that any one of the correct keyword [Kusunoki Masashige] Kd, NG keyword "'Tou'noki Masashige" NG1 and NG keyword "'Sei'noki Masashige" NG2 was touched and selected on the correct keyword selection problem screen GQ2 by, for example, the operation of the user (lecture attendant st) who was designated by the lecturer Le (step S41 (Yes)), it is judged whether the designated keyword is correct or not, based on whether the designated keyword is the correct keyword [Kusunoki Masashige] Kd or not (step S42).

For example, as illustrated in part (B) of FIG. 9, if the NG keyword "'Tou'noki Masashige" NG1 is touched and designated by the pen P (step S41 (Yes)), the sound "Boo-Boo" indicating that the answer is incorrect is output from the sound output unit, and a message "Incorrect (x)" Fa indicating that the answer is incorrect is displayed (step S42 (No)→step S45).

On the other hand, as illustrated in part (C) of FIG. 9, if the correct keyword "Kusunoki Masashige" Kd is touched and designated by the pen P (step S41 (Yes)), sound "Pin-Pon" indicating that the answer is correct is output from the sound output unit 18 and a message "Correct ○" Ta indicating that the answer is correct is displayed (step S42 (Yes)→step S43).

In this manner, on the correct keyword selection problem screen GQ2, the correct keyword [Kusunoki Masashige] Kd and the NG keywords NG1 and NG2, in which the mistakable character (character string) of the correct keyword Kd is replaced with the NG character (character string), are listed in the random order. The correct keyword Kd is learned by the comparison with the NG keywords NG1 and NG2. Thus, the user (lecture attendant st) can more effectively learn the correct keyword Kd by the comparison with the NG keywords NG1 and NG2.

When there are a plurality of combinations of selection problems composed of correct keywords and NG keywords on the correct keyword selection problem screen GQ2, if all correct keywords are touched and designated (step S44 (Yes)), sound "Pin-Pon, . . . " indicating that all answers are correct is output, and a message "All correct ☺" Ta indicating that all answers are correct is displayed (step S46).

Here, like the above, when the problem of the (B) correct keyword selection problem data 12/2 is set on the character input (board writing) area 17W, if the pages of the text (textbook) Tx of the subject of the lecture are kept displayed on the electronic text (textbook) display area 17D, the user (lecture attendant st) can refer to these pages as a hint.

Accordingly, in the course of giving the lecture while writing on the character input (board writing) area 17W, the lecturer Le may simply perform the operation of designating the important keyword Kn, inputting mistakable characters with respect to the characters (character string) constituting this keyword, and deleting these mistakable characters in order to indicate that these characters are erroneous. Thereby, the (B) correct keyword selection problem data 12/2 corresponding to the contents of the lecture can automatically be generated and registered. In addition, based on the correct keyword selection problem screen GQ2 on which the problem is set based on the (B) correct keyword selection problem data 12/2, the lecture attendant st can perform timely learning in accordance with the content of the lecture with use of NG keywords by the lecturer Le.

FIG. 10 is a view illustrating the display operation (part 3) of lecture contents corresponding to the user (lecturer) operation according to the lecturer terminal process (part 1) of the electronic blackboard (lecturer terminal) 10.

As illustrated in part (A) of FIG. 10, the lecturer Le is giving a lecture while writing a diagram H on the character input (board writing) area 17W. In this state, if it is judged that a character string "Kanrei" (a shogunal deputy) that was input in the diagram H corresponds to a keyword stored in the keyword data area 12c in the memory 12 (step S3 (Yes)→S4 (Yes)), this keyword [Kantei] K6 is distinguishably displayed by a yellow marker Ym, as illustrated in part (B) of FIG. 10 (step S5).

Then, although not illustrated, the keyword [Kanrei] K6, which is included in the data Tx of the designated document (textbook) "Junior High School History" (pp. 66-67) displayed on the electronic text (textbook) display area 17D, is also distinguishably displayed by the yellow marker Ym (step S6).

Here, on the character input (board writing) area 17W, among the character strings other than the keyword [Kanrei] K6 that is distinguishably displayed by the yellow marker Ym, if character strings "Samuraidokoro" (an office for guard and trial in Kyoto), "Mandokoro" (an office for general political and financial affairs) and "Jitou" (an estate steward), which are objects of additional keywords, are designated by double underlines (side lines in parts (B) and (C) of FIG. 10) UL1 to UL3, and if red marker display is set from the setup menu (not shown) of marker colors (step S7 (Yes)), these designated character strings are distinguishably displayed as additional keywords [Samuraidokoro] Kd1, [Mandokoro] Kd2 and [Jitou] Kd3 by the red marker Rm, and are registered and stored in the additional keyword data area 12d in the memory 12 (step S8). At this time, although not illustrated, the corresponding additional keywords [Samuraidokoro] Kd1, [Mandokoro] Kd2 and [Jitou] Kd3, which are included in the data Tx of the designated document (textbook) "Junior High School History" (pp. 66-67) displayed on the electronic text (textbook) display area 17D, are also distinguishably displayed by the red marker Rm.

As illustrated in part (C) of FIG. 10, the lecturer Le performs, by the pen P, a surrounding operation (su) for surrounding and designating the diagram H including the keyword [Kanrei] K6 and additional keywords [Samuraidokoro] Kd1, [Mandokoro] Kd2 and [Jitou] Kd3, which are written on the character string input (board writing) area 17W. If it is judged that the diagram H was designated, the kind (C) of the association operation, that is, "(C) association operation between the designated keyword and the keyword in the user-designated diagram", is detected (step S22 (Yes)). Then, the keyword [Kanrei] K6 and additional keywords [Samuraidokoro] Kd1, [Mandokoro] Kd2 and [Jitou] Kd3 are associated with the designated diagram H, and are registered and stored as the (C) association problem data between the designated keyword and the keyword in the user-designated diagram (diagram keyword problem data) 12/3 (step S23).

If the (C) diagram keyword problem data 12/3 is thus registered, the problem-setting button Q on the character string input (board writing) area 17W is distinguishably displayed in yellow Y, and it is indicated that the problem can be set.

Figure 11:
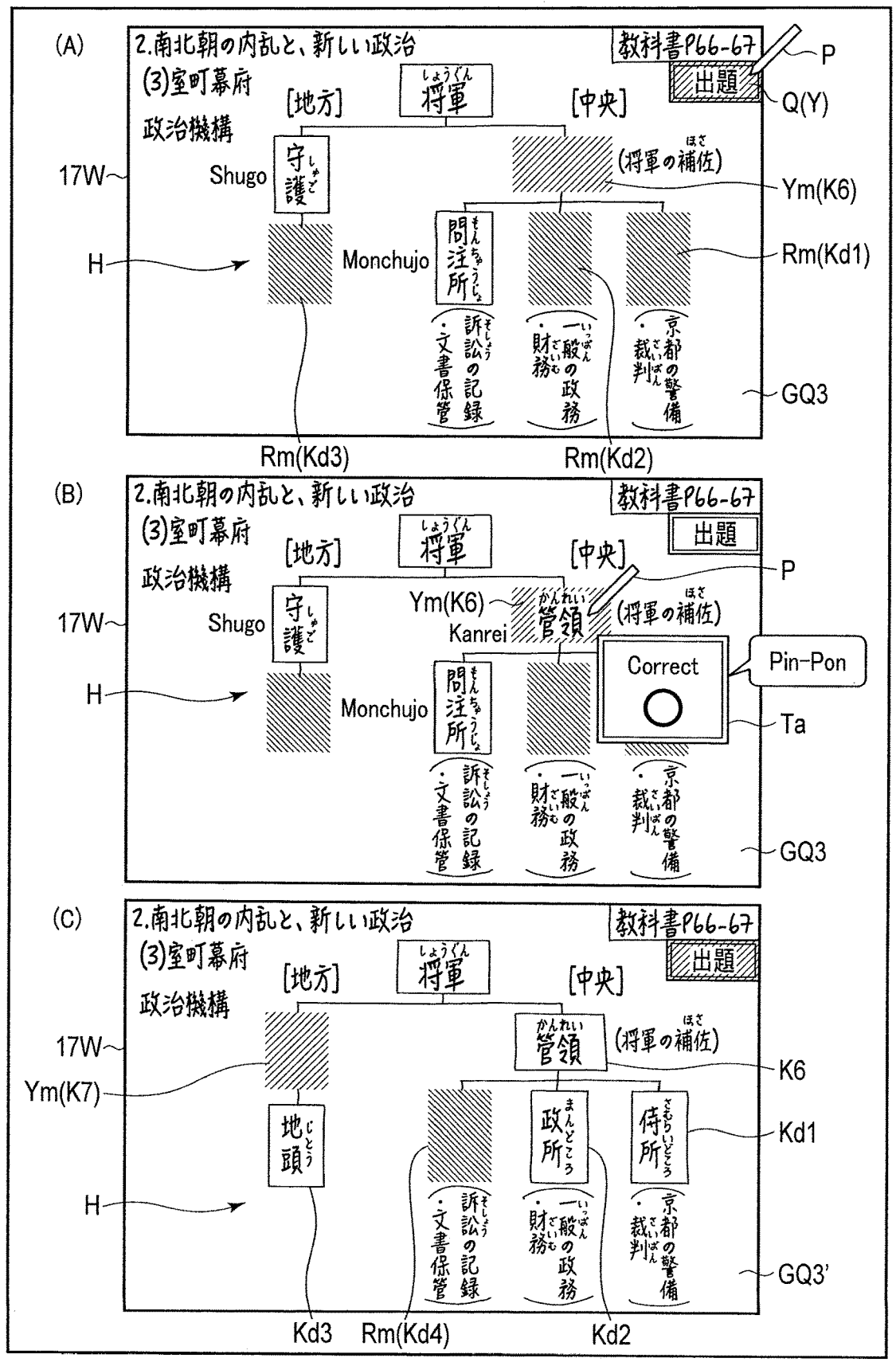
FIG. 11 is a view illustrating a problem-setting operation of (C) diagram keyword problem data 12/3 according to the lecturer terminal process (parts 2 and 3) of the electronic blackboard (lecturer terminal) 10.

FIG. 11 is a view illustrating the problem-setting operation of the (C) diagram keyword problem data 12/3 according to the lecturer terminal process (parts 2 and 3) of the electronic blackboard (lecturer terminal) 10.

If the problem-setting button Q, which is distinguishably displayed in yellow Y indicating that the problem can be set, is touch-operated on the character string input (board writing) area 17W (step S24 (Yes)), the process of steps S25 to S29 is executed in the same manner as described above, and one of the problem data, which are registered and stored in the problem-setting method-based registered data area 12f and have not yet been set, is designated as the object of the problem that is to be set.

Here, if it is judged that the problem data designated as the problem to be set is the (C) diagram keyword problem data 12/3 (diagram H/keyword [Kanrei]/additional keywords [Samuraidokoro], [Mandokoro] and [Jitou]) which was registered according to the user operation illustrated in parts (A) to (C) of FIG. 10 (step S30 (C)), a diagram keyword problem screen GQ3 is displayed, as illustrated in part (A) of FIG. 11 (step S47). The diagram keyword problem screen GQ3 displays the diagram H registered as the (C) diagram keyword problem data 12/3, such that the registered keyword [Kanrei] K6 and additional keywords [Samuraidokoro] Kd1, [Mandokoro] Kd2 and [Jitou] Kd3 in the diagram H are hidden by the corresponding yellow marker Ym and red marker Rm.

In addition, if a part of any one of the keywords K6, Kd1, Kd2 and Kd3 hidden by the marker Ym, Rm is designated by the operation of the pen P by, for example, the (lecture attendant st) who was designated by the lecturer Le, and if the keyword is handwritten as an answer (step S48 (Yes)), it is judged whether the keyword of the answer input to the part of the designated keyword is correct or not, based on whether the keyword of the answer is the registered keyword or not (step S49).

For example, as illustrated in part (B) of FIG. 11, if a part of the keyword K6 hidden by the yellow marker Ym is designated and the keyword "Kanrei" is input by handwriting as an answer (step S48 (Yes)), sound "Pin-Pon" indicating that the answer is correct is output from the sound output unit 18 and a message "Correct ☺" Ta indicating the answer is correct is displayed (step S49 (Yes)→step S50).

On the other hand, if the keyword input by handwriting as an answer is different from the registered keyword and is incorrect (step S49 (No)), sound "Boo-Boo" indicating that the answer is incorrect is output from the sound output unit 18 as in the case in which other problem data were set as problems, and a message "Incorrect (x)" Fa indicating that the answer is incorrect is displayed (step S52).

In this manner, on the diagram keyword problem screen GQ3, as regards the keyword of the important matter hidden by each marker Ym, Rm, the lecture attendant st inputs a keyword as an answer by handwriting to a part hidden by the marker Ym, Rm. Thereby, it is notified whether the input keyword is correct or not. Thus, the user (lecture attendant st) can easily and enjoyably learn the keywords of respective important matters.

Thereafter, as regards all the parts hidden by the marker Ym, Rm, if it is judged that the user (lecture attendant st) has input by handwriting the correct keywords as answers and it is judged that the input answers are correct (step S51 (Yes)), sound "Pin-Pon, ... " indicating that all answers are correct is output as in the case in which other problem data were set as problems, and a message "All correct ☺" Ta indicating that all answers are correct is displayed (step S53).

In the meantime, the following configuration may be adopted. When all keywords input by handwriting as answers to the keywords K6, Kd1, Kd2 and Kd3, which are hidden by the markers Ym and Rm in the diagram H and are set as problems on the diagram keyword problem screen GQ3, are correct, a new diagram keyword problem screen GQ3' may be displayed and the setting of problems may be continued, as illustrated in part (C) of FIG. 11. In the new diagram keyword problem screen GQ3', other keywords "Shugo" K7 (a military governor) and "Monchujo" Kd4 (an office for records of trials and storage of documents) are hidden by the yellow marker Ym and red marker Rm.

Accordingly, in the course of giving the lecture while writing the diagram H including important keywords Kn on the character input (board writing) area 17W, the lecturer Le may simply perform the operation (su) of emphasizing the additional keywords Kd1, Kd2 and Kd3 in the diagram H by double underlines UL1, UL2 and UL3 and then surrounding the diagram H itself with emphasis by the pen P. Thereby, the (C) diagram keyword problem data 12/3 corresponding to the contents of the lecture can automatically be generated and registered. In addition, based on the diagram keyword problem screen GQ3 on which the problem is set based on the (C) diagram keyword problem data 12/3, the lecture attendant st can perform timely learning in accordance with the content of the lecture with use of the diagram H by the lecturer Le.

When the problem-setting button Q displayed on the character string input (board writing) area 17W was touch-operated (step S24 (Yes)), if it is judged that there is no problem data registered in the problem-setting method-based registered data area 12f (step S25 (No)), a message "No data for problem setting" is displayed (step S54).

When the problem-setting button Q displayed on the character string input (board writing) area 17W was touch-operated (step S24 (Yes)), it may be judged that there is problem data registered in the problem-setting method-based registered data area 12f (step S25 (Yes)). Even in this case, if it is judged that there is no problem data which has not yet been set (step S26 (No)), a message "Will an already set problem be set once again?" is displayed (step S55). Then, a problem selection screen (not shown) is displayed in order to prompt the user to select the (A) association problem, (B) correct keyword selection problem or (C) diagram keyword problem (step S56), and any one of these problems is selected. Thereby, the problem-setting process from step S30 will similarly be executed.

Besides, the lecture attendant terminal (tablet terminal or the like) 20, which each lecture attendant (student or the like) St has, may be configured to have the same function as the electronic blackboard (lecturer terminal) 10. Thereby, each lecture attendant St can perform board writing on the lecture attendant terminal 20 in the same manner as the lecturer (instructor or the like) Le writes on the electronic blackboard 10 during the lecture. Thus, like the above, each lecture attendant terminal 20 itself can generate and register the (A) association problem data 12/1, (B) correct keyword selection problem data 12/2 and (C) diagram keyword problem data 12/3, and each lecture attendant St can perform timely learning in accordance with the content of the lecture by the lecturer (instructor or the like) Le.

The methods of the respective processes by the electronic blackboard (lecturer terminal) 10, which has been described in each of the above embodiments, that is, the methods of the lecturer terminal process (parts 1 to 3), etc. illustrated in the flowcharts of FIG. 3, FIG. 4 and FIG. 5 can be stored as computer-executable programs in a medium such as a memory card (ROM card, RAM card, etc.), a magnetic disk (floppy (trademark) disk, hard disk, etc.), an optical disc (CD-ROM, DVD, etc.), or a semiconductor memory, and can be distributed.

In addition, the data of the program for realizing each of the above-described methods can be transmitted on a communication network in the form of a program code, and the data of the program can be taken in a computer of an electronic device connected to the communication network. Thereby, the above-described function of generating problem data corresponding to the content of the lecture and the function of setting the problem of the problem data can be realized.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information display apparatus comprising:
   a touch panel-equipped display that is operable to receive a touch operation;
   a memory, wherein the memory has stored therein in advance a plurality of kinds of association operations that are respectively associated with a plurality of different types of touch operations that are detectable via the touch panel-equipped display; and
   a processor that is configured to:
   read out an electronic text that is stored in the memory and that is designated by a first user operation, and display the readout electronic text in a first display area of the touch panel-equipped display;
   receive an input character string that is input by a second user operation, and display the input character string in a first display screen that is displayed in a second display area of the touch panel-equipped display;
   detect if the input character string displayed in the second display area includes at least one of a plurality of keywords that are stored in the memory and that is included in the electronic text displayed in the first display area; and in a case in which it is detected that the input character string includes said at least one keyword, change a display state of the at least one keyword both in the electronic text displayed in the first display area and in the input character string displayed in the second display area from an original display state to a first changed display state, and display a part of the electronic text that includes the at least one keyword in an enlarged scale in another window in the first display area;

detect a third user operation to designate any one of the at least one keyword displayed in the second display area of the display, and change a display state of the designated keyword in the second display area from the first changed display state to a second changed display state visually indicating that the keyword has been designated;

detect, as a fourth user operation, a touch operation on the touch panel-equipped display to designate information displayed on the display other than the keyword designated by the third user operation, and change a display state of the designated information from an original display state to a changed display state visually indicating that the information has been designated, wherein the fourth user operation is an association operation and the processor is configured to detect a type of the touch operation detected as the fourth user operation and determine a kind of the association operation corresponding to the fourth user operation as the kind of association operation that is associated with the detected type of the touch operation, from among the plurality of kinds of association operations that are respectively associated with the plurality of different types of touch operations stored in advance in the memory;

associate the designated keyword designated by the third user operation and the designated information designated by the fourth user operation and register the associated designated keyword and the designated information as association problem data in the memory, in accordance with the determined kind of the association operation corresponding to the detected type of touch operation detected as the fourth user operation;

designate the association problem data as an object of a problem to be set;

set a problem-setting method with respect to the designated keyword, the problem-setting method corresponding to the determined kind of the association operation;

display, on the display, a second display screen corresponding to the set problem-setting method; and generate a problem based on the association problem data and display the generated problem in the second display screen on the display.

2. The information display apparatus of claim 1, wherein the processor is configured:

to generate the association problem data so as to correspond to the set problem-setting method; and to display the generated problem based on the generated association problem data.

3. The information display apparatus of claim 2, wherein the processor is configured:

in a case in which an instruction is received to display the set generated problem, to turn off display of the first display screen in which the character string is displayed in the second display area of the display, and to display the second display screen in which the set generated problem is displayed in the second display area of the display.

4. The information display apparatus of claim 1, wherein the association operation comprises an operation of touching and designating, by the fourth user operation, as the information, a character string which is an object of association with the designated keyword.

5. The information display apparatus of claim 4, wherein the determined kind of the association operation is an association operation between the designated keyword and the touched character string.

6. The information display apparatus of claim 5, wherein the processor is configured to set a first problem-setting method of associating a character string of the designated keyword and the touched character string in accordance with the determined kind of the association operation.

7. The information display apparatus of claim 6, wherein the processor is configured to set a high-level problem-setting method of associating a keyword blank character string, in which a character that is a part of a character string of the designated keyword is made blank, and another designated character string.

8. The information display apparatus of claim 1, wherein the association operation comprises an operation of inputting, by the fourth user operation, as the information, a substitute character which is associated with the designated keyword.

9. The information display apparatus of claim 8, wherein the determined kind of the association operation is an association operation between the designated keyword and a substitute character string.

10. The information display apparatus of claim 9, wherein the processor is configured to set a second problem-setting method of selecting, in accordance with the determined kind of the association operation, a character string of the designated keyword and the substitute character string in which a character that is a part of the character string of the designated keyword is replaced with the substitute character.

11. The information display apparatus of claim 1, wherein the association operation is an operation of designating, by the fourth user operation, as the information, a diagram which is associated with the designated keyword.

12. The information display apparatus of claim 1, wherein the determined kind of the association operation is an association operation between the designated keyword and a keyword in a diagram designated by the fourth user operation.

13. The information display apparatus of claim 12, wherein the processor is configured to set a third problem-setting method of hiding a keyword character string included in a designated range in accordance with the detected kind of the association operation.

14. The information display apparatus of claim 1, wherein the processor is configured to add, as a new keyword, a character string designated in accordance with a fifth user operation among character strings displayed on the display.

15. The information display apparatus of claim 14, wherein the processor is configured to distinguishably display, as a keyword character string, a keyword prestored in the memory or the added keyword among the character strings displayed on the display.

16. An information display method for an information display apparatus including (i) a touch panel-equipped display that is operable to receive a touch operation, (ii) a memory that has stored therein in advance a plurality of kinds of association operations that are respectively associated with a plurality of different types of touch operations that are detectable via the touch panel-equipped display, and (iii) a processor, the method comprising:

causing the processor to read out an electronic text that is stored in the memory and that is designated by a first user operation, and display the readout electronic text in a first display area of the touch panel-equipped display;

causing the processor to receive an input character string that is input by a second user operation, and display the input character string in a first display screen that is displayed in a second display area of the touch panel-equipped display;

causing the processor to detect if the input character string displayed in the second display area includes at least one of a plurality of keywords that are stored in the memory and that is included in the electronic text displayed in the first display area;

in a case in which it is detected that the input character string includes said at least one keyword, causing the processor to change a display state of the at least one keyword both in the electronic text displayed in the first display area and in the input character string displayed in the second display area from an original display state to a first changed display state, and display a part of the electronic text that includes the at least one keyword in an enlarged scale in another window in the first display area;

causing the processor to detect a third user operation to designate any one of the at least one keyword displayed in the second display area of the display, and change a display state of the designated keyword in the second display area from the first changed display state to a second changed display state visually indicating that the keyword has been designated;

causing the processor to detect, as a fourth user operation, a touch operation on the touch panel-equipped display to designate information displayed on the display other than the keyword designated by the third user operation, and change a display state of the designated information from an original display state to a changed display state visually indicating that the information has been designated, wherein the fourth user operation is an association operation and the method comprises causing the processor to detect a type of the touch operation detected as the fourth user operation and determine a kind of the association operation corresponding to the fourth user operation as the kind of association operation that is associated with the detected type of the touch operation, from among the plurality of kinds of association operations that are respectively associated with the plurality of different types of touch operations stored in advance in the memory;

causing the processor to associate the designated keyword designated by the third user operation and the designated information designated by the fourth user operation and register the associated designated keyword and the designated information as association problem data in the memory, in accordance with the determined kind of the association operation corresponding to the detected type of touch operation detected as the fourth user operation;

causing the processor to designate the association problem data as an object of a problem to be set;

causing the processor to set a problem-setting method with respect to the designated keyword, the problem-setting method corresponding to the determined kind of the association operation;

causing the processor to display, on the display, a second display screen corresponding to the set problem-setting method; and causing the processor to generate a problem based on the association problem data and display the generated problem in the second display screen on the display.

17. A non-transitory recording medium having a program recorded thereon that is executable by a computer of an information display apparatus including (i) a touch panel-equipped display that is operable to receive a touch operation, (ii) a memory that has stored therein in advance a plurality of kinds of association operations that are respectively associated with a plurality of different types of touch operations that are detectable via the touch panel-equipped display, and (iii) a processor, the program being executable by the computer to control the computer to:

cause the processor to read out an electronic text that is stored in the memory and that is designated by a first user operation, and display the readout electronic text in a first display area of the touch panel-equipped display;

cause the processor to receive an input character string that is input by a second user operation, and display the input character string in a first display screen that is displayed in a second display area of the touch panel-equipped display;

cause the processor to detect if the input character string displayed in the second display area includes at least one of a plurality of keywords that are stored in the memory and that is included in the electronic text displayed in the first display area;

in a case in which it is detected that the input character string includes said at least one keyword, cause the processor to change a display state of the at least one keyword both in the electronic text displayed in the first display area and in the input character string displayed in the second display area from an original display state to a first changed display state, and display a part of the electronic text that includes the at least one keyword in an enlarged scale in another window in the first display area;

cause the processor to detect a third user operation to designate any one of the at least one keyword displayed in the second display area of the display, and change a display state of the designated keyword from the first changed display state to a second changed display state visually indicating that the keyword has been designated;

cause the processor to detect, as a fourth user operation, a touch operation on the touch panel-equipped display to designate information displayed on the display other than the keyword designated by the third user operation, and change a display state of the designated information from an original display state to a changed display state visually indicating that the information has been designated, wherein the fourth user operation is an association operation and the program controls the computer to cause the processor to detect a type of the touch operation detected as the fourth user operation and determine a kind of an association operation corresponding to the fourth user operation as the kind of association operation that is associated with the detected type of the touch operation, from among the plurality of kinds of association operations that are respectively associated with the plurality of different types of touch operations stored in advance in the memory;

cause the processor to associate the designated keyword designated by the third user operation and the designated information designated by the fourth user operation and register the associated designated keyword and the designated information as association problem data in the memory, in accordance with the determined kind of the association operation corresponding to the detected type of touch operation detected as the fourth user operation;

cause the processor to designate the association problem data as an object of a problem to be set;

cause the processor to set a problem-setting method with respect to the designated keyword, the problem-setting method corresponding to the determined kind of the association operation;

cause the processor to display, on the display, a second display screen corresponding to the set problem-setting method; and cause the processor to generate a problem based on the association problem data and display the generated problem in the second display screen on the display.

* * * * *

UNITED STATES PATENT AND TRADEMARK OFFICE
CERTIFICATE OF CORRECTION

PATENT NO. : 10,984,671 B2
APPLICATION NO. : 15/925696
DATED : April 20, 2021
INVENTOR(S) : Kojo It is certified that error appears in the above-identified patent and that said Letters Patent is hereby corrected as shown below:

On the Title Page

Column 2, item (57) under "ABSTRACT," Line 1, after "According" insert --to--.

In the Claims

Column 17, Line 65 (Claim 3), delete "set".

Column 18, Line 1 (Claim 3), delete "set".

Signed and Sealed this
Fourteenth Day of June, 2022

*Katherine Kelly Vidal*

Katherine Kelly Vidal
*Director of the United States Patent and Trademark Office*